US008209558B2

(12) United States Patent
Rozen et al.

(10) Patent No.: US 8,209,558 B2
(45) Date of Patent: Jun. 26, 2012

(54) SYSTEM AND METHOD FOR CONTROLLING VOLTAGE AND FREQUENCY IN A MULTIPLE VOLTAGE ENVIRONMENT

(75) Inventors: Anton Rozen, Gedera (IL); Michael Priel, Hertzelia (IL); Sergey Sofer, Reshon Letzion (IL)

(73) Assignee: Freescale Semiconductor, Inc., Austin, TX (US)

( * ) Notice: Subject to any disclaimer, the term of this patent is extended or adjusted under 35 U.S.C. 154(b) by 1038 days.

(21) Appl. No.: 12/090,044

(22) PCT Filed: Oct. 12, 2005

(86) PCT No.: PCT/IB2005/053356
§ 371 (c)(1),
(2), (4) Date: Apr. 11, 2008

(87) PCT Pub. No.: WO2007/042863
PCT Pub. Date: Apr. 19, 2007

(65) Prior Publication Data
US 2008/0265674 A1    Oct. 30, 2008

(51) Int. Cl.
*G06F 1/32* (2006.01)
*G06F 1/00* (2006.01)
*H03K 19/0175* (2006.01)
*H03B 1/00* (2006.01)
(52) U.S. Cl. ........... 713/320; 713/300; 326/81; 327/108
(58) Field of Classification Search .................. 713/300, 713/320; 326/81; 327/108
See application file for complete search history.

(56) References Cited

U.S. PATENT DOCUMENTS

| | | | |
|---|---|---|---|
| 5,612,892 A | 3/1997 | Almulla | |
| 5,614,847 A * | 3/1997 | Kawahara et al. | 326/98 |
| 6,181,542 B1 * | 1/2001 | Liang et al. | 361/111 |
| 6,525,587 B2 | 2/2003 | Makino | |
| 6,667,648 B2 * | 12/2003 | Stout et al. | 327/333 |
| 6,683,485 B1 * | 1/2004 | Wert | 327/333 |
| 6,774,696 B2 | 8/2004 | Clark et al. | 327/333 |
| 6,785,829 B1 * | 8/2004 | George et al. | 713/320 |
| 6,861,873 B2 * | 3/2005 | Correale, Jr. | 326/81 |
| 6,888,395 B2 * | 5/2005 | Mizuno et al. | 327/333 |
| 6,928,559 B1 | 8/2005 | Beard | |
| 6,948,079 B2 * | 9/2005 | Zhang et al. | 713/300 |
| 6,963,231 B2 * | 11/2005 | Yang | 327/112 |
| 7,142,009 B1 * | 11/2006 | Watt et al. | 326/38 |
| 7,170,811 B1 * | 1/2007 | Allen | 365/226 |
| 7,183,808 B2 * | 2/2007 | Lai | 326/112 |
| 7,265,600 B2 * | 9/2007 | Boerstler et al. | 327/333 |
| 7,279,927 B2 * | 10/2007 | Falkowski et al. | 326/33 |
| 7,382,168 B2 * | 6/2008 | Bhattacharya et al. | 327/112 |

(Continued)

*Primary Examiner* — Paul R Myers
*Assistant Examiner* — Christopher A Daley

(57) ABSTRACT

A system that includes a first circuitry, a second circuitry, a first supply unit and a second supply unit; characterized by including a second control unit adapted to determine a level of a second supply voltage supplied by the second supply unit in response to an estimated power consumption of the second circuitry and an estimated power consumption of a voltage level shiftless interface circuitry that receives both the first and second supply voltages. A method for controlling voltage level and clock signal frequency supplied to a system, the method includes providing a first supply voltage to a first circuitry and providing a second supply voltage to a second circuitry; characterized by determining a level of the second supply voltage in response to an estimated power consumption of the second circuitry and an estimated power consumption of a voltage level shiftless interface circuitry that receives both the first and second supply voltages.

20 Claims, 10 Drawing Sheets

U.S. PATENT DOCUMENTS

| | | | |
|---|---|---|---|
| 7,564,274 B2 * | 7/2009 | Hughes | 327/108 |
| 7,925,906 B2 * | 4/2011 | Ranganathan et al. | 713/320 |
| 2004/0260958 A1 | 12/2004 | Issa et al. | |
| 2005/0077919 A1 | 4/2005 | Sowden et al. | |
| 2006/0220676 A1 * | 10/2006 | Kanazawa | 326/33 |

* cited by examiner ent is correlated with the clock frequency supplied to this domain, but this is not necessarily so. In such a case the voltage domains are also referred to as frequency domains.

SYSTEM AND METHOD FOR CONTROLLING VOLTAGE AND FREQUENCY IN A MULTIPLE VOLTAGE ENVIRONMENT

FIELD OF THE INVENTION

The present invention relates to systems and methods for controlling supply voltage and clock signal frequency within a multiple voltage environment and especially in integrated circuits.

BACKGROUND OF THE INVENTION

Mobile devices, such as but not limited to personal data appliances, cellular phones, radios, pagers, lap top computers, and the like are required to operate for relatively long periods before being recharged. These mobile devices usually include one or more processors as well as multiple memory modules and other peripheral devices.

Various timing constraints are imposed upon transistor based circuits. Some circuits should be faster then other circuits. Typically, the speed of a transistor-based circuit is responsive to various parameters including the voltage supplied to that circuit, the threshold voltage of the transistor, and the like.

In order to reduce the power consumption of a transistor based device lower voltage levels can be supplied to the device. These lower voltage levels can reduce the speed of the device and cause timing violations. U.S. Pat. No. 5,612,892 of Almulla, being incorporated herein by reference, describes one solution for reducing the power consumption of an integrated circuit.

In order to reduce the overall power consumption of a device one prior art solution involved providing high level voltage to a certain portion of the device while providing low level voltage to another portion of the device and providing level shifters between these portions. The first portion is also referred to as a critical path and usually includes logic paths such as portions of a processor. Each portion is also referred to as a frequency (or voltage) domain.

In many cases the number of level shifters is very large and the aggregate real estate required for the implementation of these level shifters is also large. Numerous level shifters require large area and consume a large amount of power.

Another power reduction technique involves voltage and/or frequency scaling and is known as DVS or DVFS. It includes altering the level of supply voltage as well as altering the frequency of the clock signal provided to a circuit, so as to adapt the power consumption of that circuit to an expected performance level of that circuit.

There is a need to provide a method and a system for providing voltage and clock signals to a system that includes multiple voltage supply units that may provide different supply voltages to different circuits.

SUMMARY OF THE PRESENT INVENTION

The invention provides a method and a system for controlling voltage level and clock signal frequency in a multiple voltage environment as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following description relates to a system that includes two or three voltage domains. It is noted that the method can be applied in a system that includes more than three voltage domains. Typically, multiple voltage domains require separate control for each voltage domain but this is not necessarily so.

Conveniently, the voltage provided to a certain domain is correlated with the clock frequency supplied to this domain, but this is not necessarily so. In such a case the voltage domains are also referred to as frequency domains.

It is further noted that although the following example refers to MOS transistors this is not necessarily so as transistors that are manufactured by other processes can be represented by reference circuits.

The invention provides a system that includes multiple circuitries that are connected via voltage level shiftless interface circuitries. A voltage level shiftless interface circuitry receives at least two different supply voltages and does not include a level shifter. According to an embodiment of the invention a voltage level shiftless interface circuitry can include a non-significant number of level shifters. A voltage level shiftless interface circuitry conveniently includes one or more voltage level shiftless interface circuits, such as but not limited to inverters. Conveniently, a voltage level shiftless interface circuitry performs a logic operation (for example as acts as a part of a critical path) such as but not limited performing an inversion operation, and the like.

Conveniently, the system includes one or more control units that are adapted to determine a level of a supply voltage supplied by one or more supply units in response to: (i) an estimated power consumption of a certain circuitry, and (ii) an estimated power consumption of a voltage level shiftless interface circuitry that is connected to that certain circuitry.

Conveniently the system and method perform a tradeoff between power that can be saved by reducing the voltage supplied to a low voltage circuitry and between the power consumed by an interface circuitry, whereas the latter increases when the difference between a voltage supplied to a high voltage circuitry and the low voltage increases.

According to an embodiment of the invention the tradeoff is responsive to various parameters such as temperature, process case, and the like. The system and method dynamically calculate or estimate these parameters and adjusts the voltage provided to the circuits accordingly.

Figure 1:
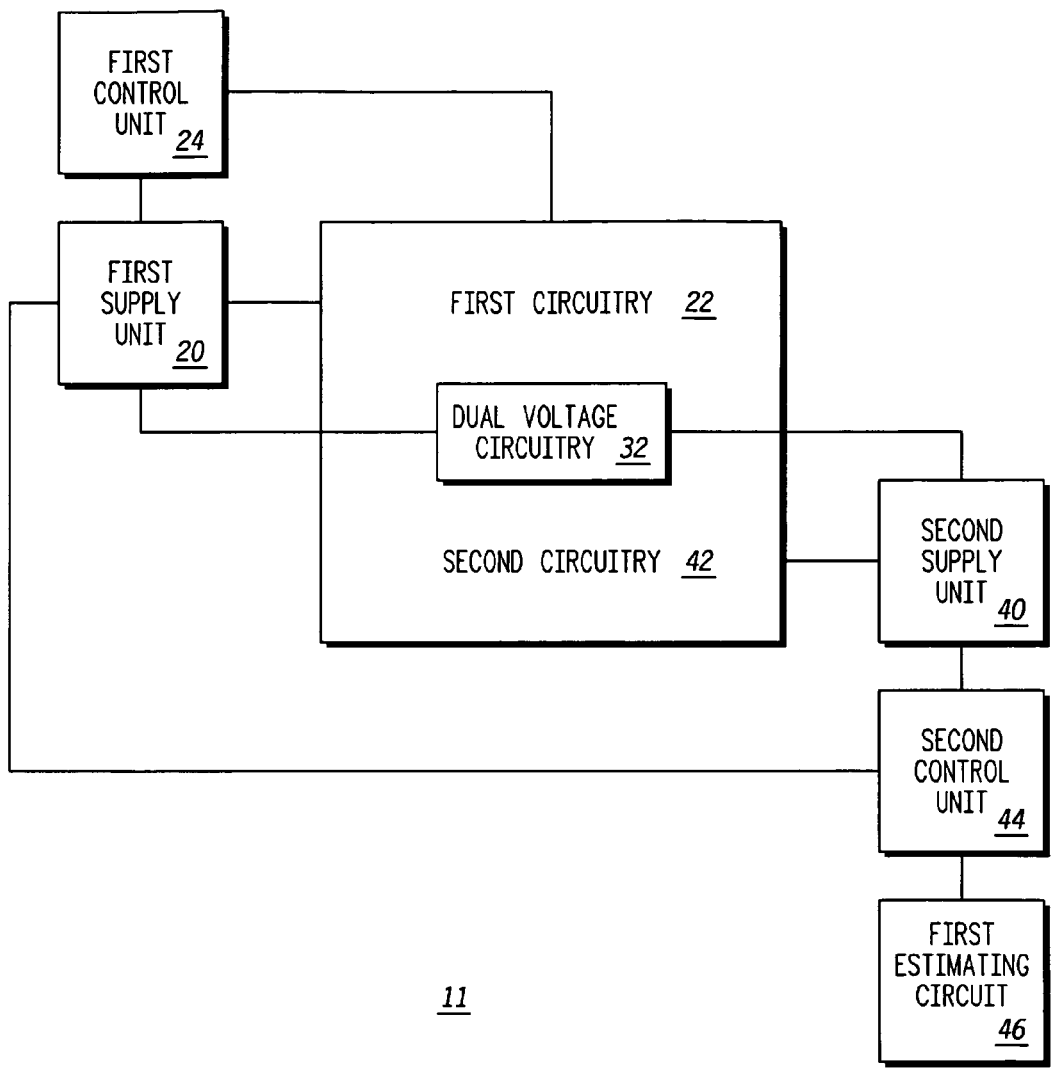
FIG. 1 illustrates a system that includes two voltage domains, according to an embodiment of the invention.

FIG. 1 illustrates a system 11 that includes two voltage domains, according to an embodiment of the invention.

System 11 includes a first control unit 24 that is connected to a first supply unit 20. The first supply unit 20 provides a supply voltage and/or a clock signal to first circuitry 22 thus defining a first voltage domain. The first supply unit 20 provides said voltage and/or clock signals to a voltage level shiftless interface circuitry such as interface circuitry 32. Optionally, the voltage supplied by the first supply unit 20 is also provided to a second control unit 44 and/or to a first estimating circuit 46.

System 11 also includes a second control unit 44 that is connected to a second supply unit 40. The second supply unit 40 provides a supply voltage and/or a clock signal to second circuitry 42 that defines a second voltage domain. The second supply unit 40 also provides said voltage and/or clock signals to the interface circuitry 32.

According to various embodiments of the invention the first and second supply units 20 and 44 can be integrated to provide a single supply unit, but this is not necessarily so.

According to various embodiments of the invention the power supply units 20 and 40 can be included within the same integrated circuit as circuitries 22 and 42 but this is not necessarily so.

Conveniently, each supply unit (out of units 20 and 40) includes one or more voltage supply source and one or more clock signals sources as well as correlating (or synchronizing) unit that correlates between the voltage level and the clock frequency provided to a certain circuitry.

The second control unit 44 can determine which voltage to provide to the second circuitry 42 in response to an estimated power consumption of the second circuitry 42 and an estimated power consumption of voltage level shiftless interface circuitry 32. Conveniently, the second control unit 44 is adapted to (i) estimate a leakage current of a voltage level shiftless interface circuit that belongs to the voltage level shiftless interface circuitry 32, and accordingly (ii) determine the power consumption resulting from differences between a first voltage level and a second voltage level provided to voltage level shiftless interface circuitry 32. The estimation can be responsive to signals provided by first estimating circuit 46, as well as to the voltage provided to the first circuitry 22.

Conveniently, the estimation takes into account various characteristics such as temperature, process case, and the like. The temperature can be estimated in various prior art methods such as monitoring a current generated from a temperature sensitive diode, measuring a temperature responsive delay of a ring oscillator, and the like.

The process case reflects allowed process deviations (or inconsistencies) that can alter the characteristics of transistors. For example, wider transistors are characterized by higher leakage currents. The process case characteristics can be estimated by various prior art methods such as providing a relationship between a delay of a ring oscillator and process cases, at a given temperature, and determining the process case in response to the actual delay of the ring oscillator. The delay can be measured in various manners, including counting the number of ring oscillator counts per a given time window.

According to another embodiment of the invention the temperature and process case are not separately estimated, although they can be separately estimated. For example, if an estimating circuit represents a voltage level shiftless interface circuit then a measurement of the leakage current (and optionally a comparison between that current and a well known current) of that estimating circuit can provide an indication about the leakage current of a voltage level shiftless interface circuit.

Figure 2:
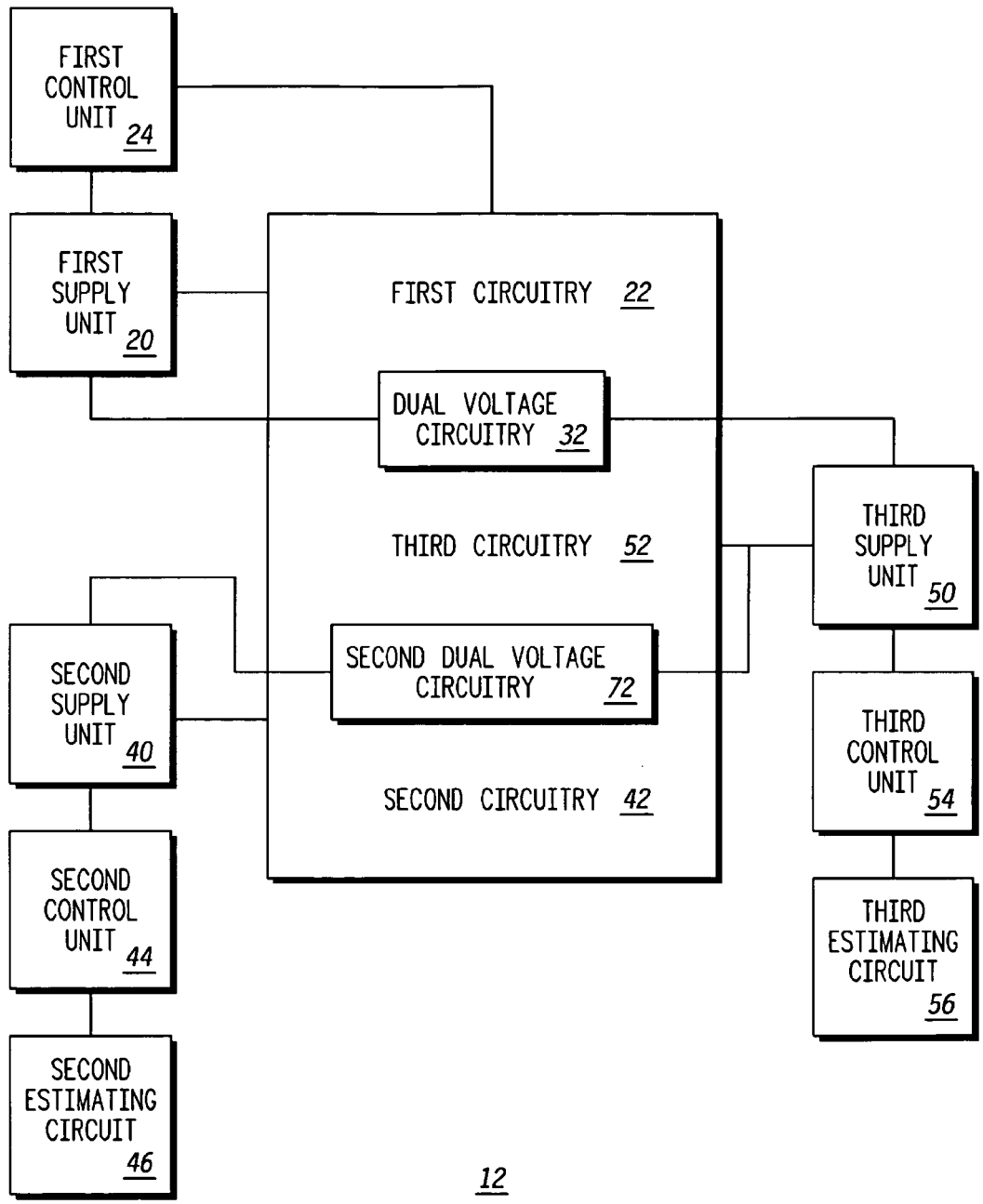
FIG. 2 illustrates a system that includes three voltage domains, according to an embodiment of the invention.

FIG. 2 illustrates a system 12 that includes three voltage domains, according to an embodiment of the invention.

System 12 resembles system 11 but includes three voltage domains (instead of two), includes two voltage level shiftless interface circuitries (instead of one), and includes additional circuitry (components 50-56) to control the voltage provided to the third circuitry.

System 12 includes three voltage domains, represented by first till third circuitries 22, 42 and 52. The first circuitry 22 is connected to the third circuitry 52 via a voltage level shiftless interface circuitry such as first voltage level shiftless interface circuitry 62. The second circuitry 42 is connected to the third circuitry 52 via another voltage level shiftless interface circuitry such as second voltage level shiftless interface circuitry 72. The first voltage level shiftless interface circuitry 62 receives voltage and/or clock signals from the second and third supply units 40 and 50. The second voltage level shiftless interface circuitry 72 receives voltage and/or clock signals from the first and third supply units 20 and 50. The third control unit 54 is connected between a second estimating circuit 56 and the third supply unit 50. Components 50-56 are analogues to components 40-46.

The voltage level supplied to the third circuitry 52 can be lower than the voltage provided to the first circuitry 22 and higher than the voltage provided to the second circuitry 42, but this is not necessarily so.

Figure 3:
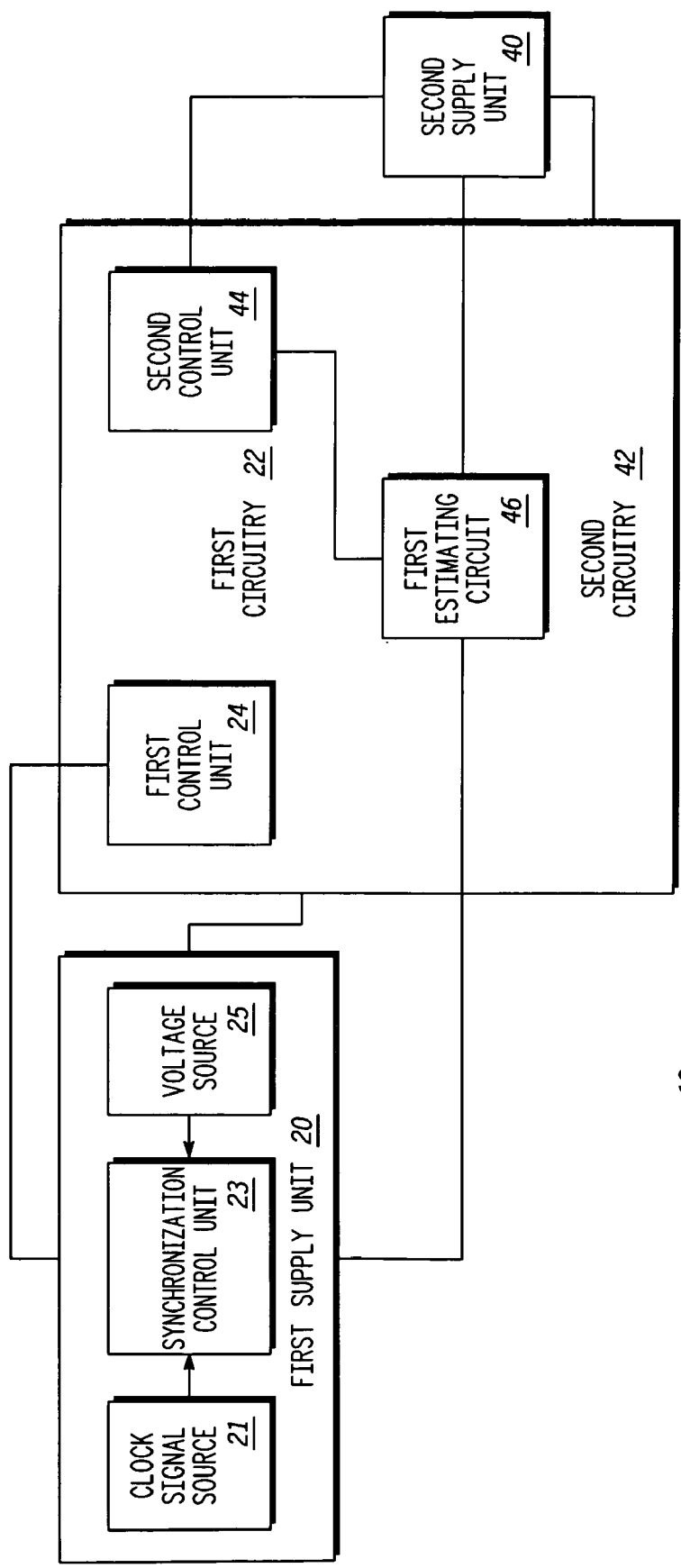
FIG. 3 illustrates in greater details a system that includes two voltage domains, according to an embodiment of the invention.

FIG. 3 illustrates in greater details a system 13 that includes two voltage domains, according to an embodiment of the invention.

System 13 includes components 21, 23 and 25, while system 11 does not necessarily include these components. Additionally or alternatively, the relationship illustrated in FIG. 3 between (i) the first and second circuitries 22 and 32 and (ii) components 44 and 46 does not necessarily exist in system 11.

The first supply unit 20 of system 13 provides a supply voltage (also referred to as high voltage or first voltage) $V_H$ 204 as well as a clock signal CLK of a certain frequency F from a synchronization control unit 23 that synchronizes the levels of $V_H$ 204 and F such as to prevent, for example, a case in which the supplied voltage $V_H$ 204 does not allow the first circuitry 22 to operate at the frequency F of the clock signal. The synchronization control unit 23 is connected to a clock signal source 21 for receiving the clock signal and is also connected to a voltage source 25 for receiving the supply voltage.

Conveniently, the clock signal source 21 includes two phase locked loops, whereas while one is supplying a current clock signal of a current frequency the other can be tuned to supply the next clock signal having a next frequency. The voltage source can also include two voltage sources but this is not necessarily so. It is further noted that synchronization control unit 23 can be implemented by software components, and can even be an integral part of a processor, such as processor 110 of FIG. 4.

The second control unit 44 is includes within the first circuitry while the first estimating circuit 46 is included within the voltage level shiftless interface circuitry 32.

Figure 4:
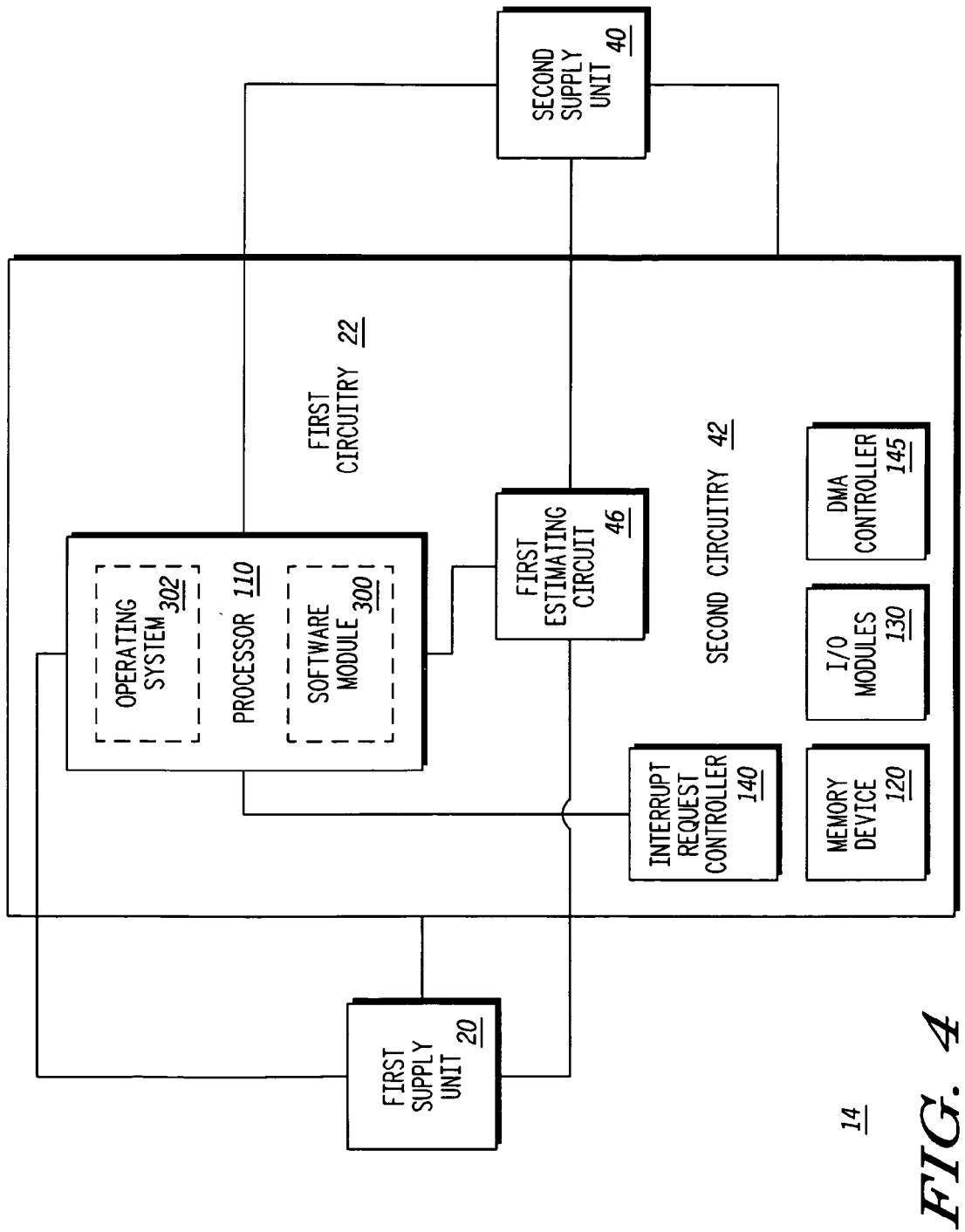
FIG. 4 is a detailed illustration of a system that includes two voltage domains, according to an embodiment of the invention.

FIG. 4 is a detailed illustration of a system 14 that includes two voltage domains, according to an embodiment of the invention.

The second circuitry 42 usually receives a lower supply voltage (also referred to as a second voltage or a low level voltage $V_L$ 202) that is usually lower than $V_H$ 204. The second circuitry 42 can include portions of processor 110 (although these portions are not illustrated in FIG. 4), a memory device 120, I/O modules 130, a DMA controller 145 and the like.

The first circuitry 42 includes processor 110 that can execute various software components such as but not limited to an operating system 302, as well as software module 300. The software module 300 can include instructions that enable processor 110 to participate in the determination of the voltage level (and/or clock frequency) provided to the first circuitry 22 and/or to the second circuitry 42.

According to an embodiment of the invention the software module 300 includes a voltage and clock signal source configuration module (not shown) that is capable of configuring the clock signal source 21 as well as the voltage source 25. Said configuration can be performed by various prior art methods, such as writing control values to registers accessed by these sources. According to yet another embodiment of the invention the software module 300 can be replaced by a hardware module.

According to yet another embodiment of the invention the processor 110 can include the first and second control units 24 and 44. This is not necessarily so. For example, additional hardware can be required to perform various tasks relating to the determination of the voltage supplied to the second circuitry 42 and/or to the first circuitry 22.

According to an embodiment of the invention the first control unit 24 and/or the second control unit 44 can apply voltage and clock frequency scaling mechanisms. Thus, the first control unit 24 and/or the second control unit 44 can determine the voltage level (and/or the clock frequency) that should be provided by the supply units 20 and 40 in response to at least one voltage and frequency scaling parameter.

A voltage and frequency scaling parameter can be a target power consumption level, a target performance level, a response time of the voltage and clock frequency scaling mechanism, sensitivity to a load (such as a computational load) increment, sensitivity to a load (such as a computational load) decrement, and the like.

In some case the appliance of voltage and clock frequency scaling mechanisms reduces the difference between the first and second voltages, and accordingly reduces the leakage current of the voltage level shiftless interface circuitry. This can occur, for example, when the load of the first circuitry 32 is relatively low and the voltage level supplied by the first supply unit 22 is reduced. This can occur during standby modes, but this is not necessarily so.

Those of skill in the art will appreciate that either one of the voltages supplied to either once of the circuits of either one of the illustrated circuits (such as $V_H$ and $V_L$) can be subjected to voltage and frequency scaling techniques. FIG. 5-FIG. 8 illustrate various examples of circuits that can belong to the voltage level shiftless interface circuitry 32 and the second circuitry 42, according to various embodiments of the invention. FIG. 6 also illustrates a circuit that belongs to the first circuitry 22.

Figure 6:
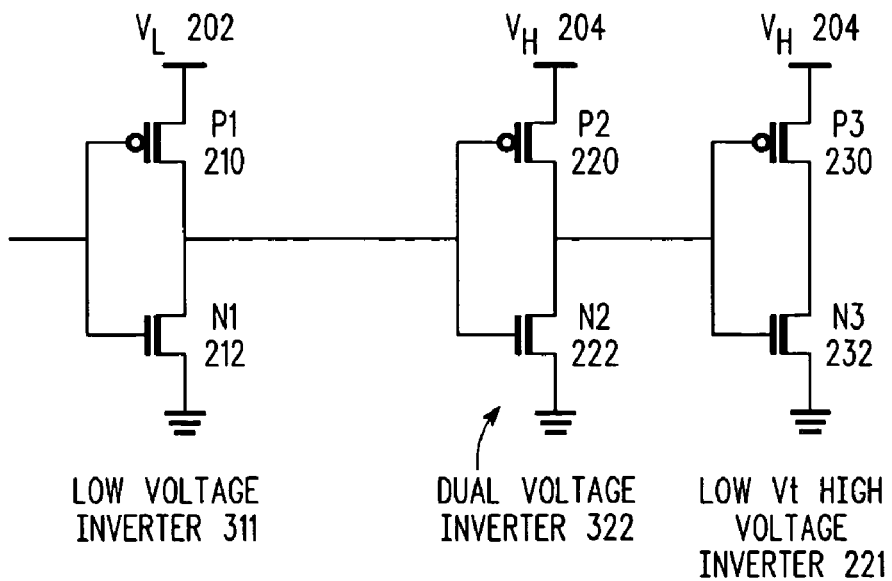
FIG. 6 illustrates three inverters, according to an embodiment of the invention.
Figure 7:
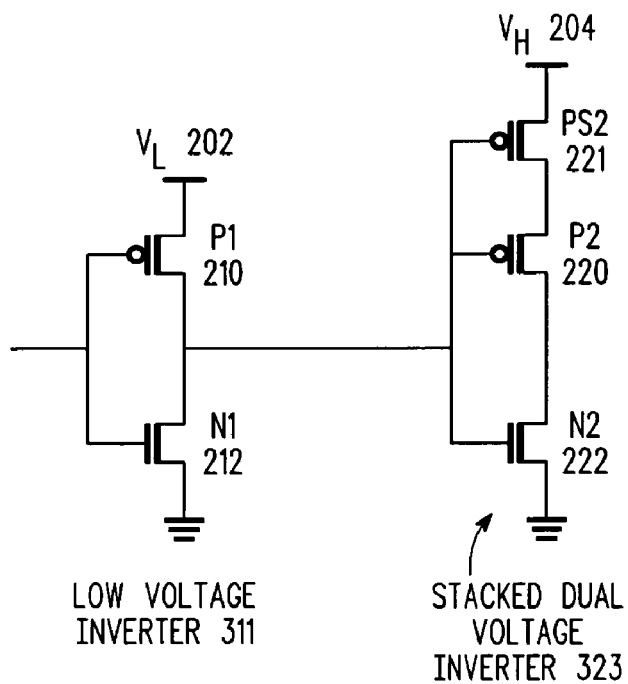
FIG. 7 illustrates a low voltage inverter and a stacked interface inverter, according to an embodiment of the invention.
Figure 8:
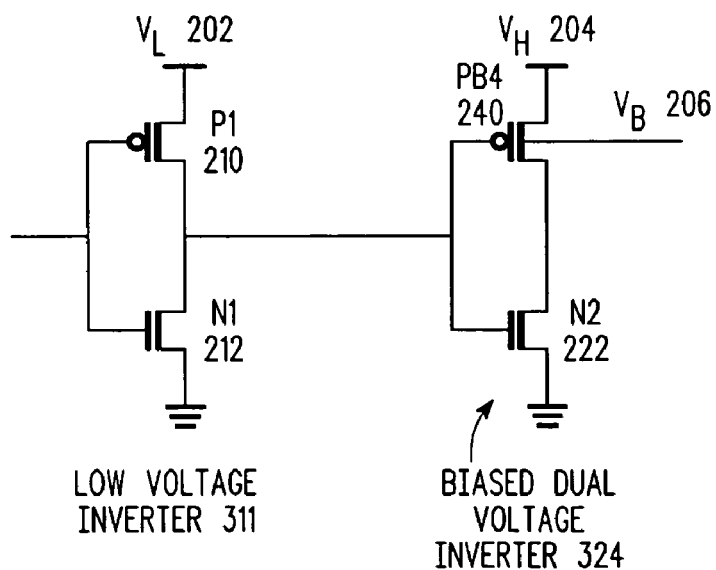
FIG. 8 illustrates a low voltage inverter and a biased interface inverter, according to an embodiment of the invention.

FIG. 6-FIG. 8 further illustrate various configurations that are aimed to reduce the leakage current of an interface inverter 322. Accordingly, various components illustrated in these FIGs. (such as 322, 221 and 240) can be regarded as leakage current reducers.

Figure 5:
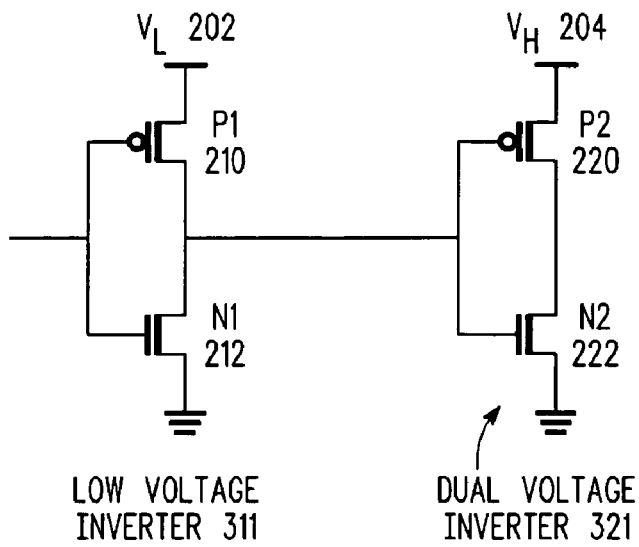
FIG. 5 illustrates a low voltage inverter and an interface inverter, according to an embodiment of the invention.

FIG. 5 illustrates a low voltage inverter 311 and an interface inverter 321, according to an embodiment of the invention.

The low voltage inverter 311 defines an edge of the second circuitry 42. It includes a PMOS transistor P1 210 and an NMOS transistor N1 212. The gates of P1 210 and N1 212 are connected in parallel to each other to define an input node of low voltage inverter 311. The drain of P1 210 is connected to the drain of N1 212 such as to define an output node of the low voltage inverter 311. The source of N1 212 is grounded. The source of P1 202 receives $V_L$ 202. When the voltage inverter 311 outputs a "high" output signal this signal is substantially equal to $V_L$ 202 or smaller than $V_L$ 202.

The interface inverter 321 is connected between the low voltage inverter 311 and circuits that belong to the first circuitry 22. A critical path usually starts at interface inverter 321 or at the circuits that are connected to the output node of the interface inverter 321.

The interface inverter 321 includes a PMOS transistor P2 220 and an NMOS transistor N2 222. The gates of P2 220 and N2 222 are connected in parallel to each other to define an input node of the interface inverter 321. The drain of P2 220 is connected to the drain of N2 222 to define an output node of the interface inverter 321. The source of N2 222 is grounded. The source of P2 222 receives $V_H$ 204.

Transistor P2 220 receives a relatively low voltage (311's output) at its gate and a relatively high signal ($V_H$ 204) at its source, thus it leaks. This leakage current is also referred to as crow bar current or crowbar current.

This leakage current causes the interface inverter 321 (that is included within the voltage level shiftless interface circuitry 32) to consume power. The consumed power is responsive, among other things, to the amount of leaking transistors within the voltage level shiftless interface circuitry 32.

FIG. 6 illustrates three inverters 311, 322 and 211, according to an embodiment of the invention.

The low voltage inverter 311 is connected to a high threshold voltage interface inverter 322. The high threshold voltage interface inverter 322 is also connected to a low threshold voltage inverter 221. The low threshold voltage inverter 221 belongs to the first circuitry 22.

Using a high threshold voltages interface inverter 322 (instead of a low thresholds voltage interface inverter) reduces the leakage current of the voltage level shiftless interface circuitry 32. On the other hand, high threshold voltage transistors are slower then corresponding low threshold voltage transistors. Thus, the first circuitry 22 includes a low threshold voltage inverter 221. In this case the critical path starts at the low threshold voltage inverter 221.

FIG. 7 illustrates a low voltage inverter 311 and a stacked interface inverter 323, according to an embodiment of the invention.

The stacked interface inverter 311 includes an additional PMOS transistor PS2 221. The gates of P2 220, PS 221 and N2 222 are connected in parallel to each other to define an input node of the stacked interface inverter 311. The drain of P2 220 is connected to the drain of N2 222 to define an output node of the interface inverter 321. The source of N2 222 is grounded. The drain of PS2 221 is connected to the source of P2 222. The source of PS2 221 receives $V_H$ 204. This configuration also reduces the leakage current. The number of stacked transistors can exceed one.

FIG. 8 illustrates a low power inverter 311 and a biased interface inverter 324, according to an embodiment of the invention.

The biased interface inverter 324 includes a biased transistor PB4 240 instead of transistor P2 220. The biased transistor PB4 receives a bias voltage that reduces its leakage current. Conveniently the voltage supplied to the bulk of PB4 240 is higher than the voltage supplied to the source of PB 240.

Figure 9:
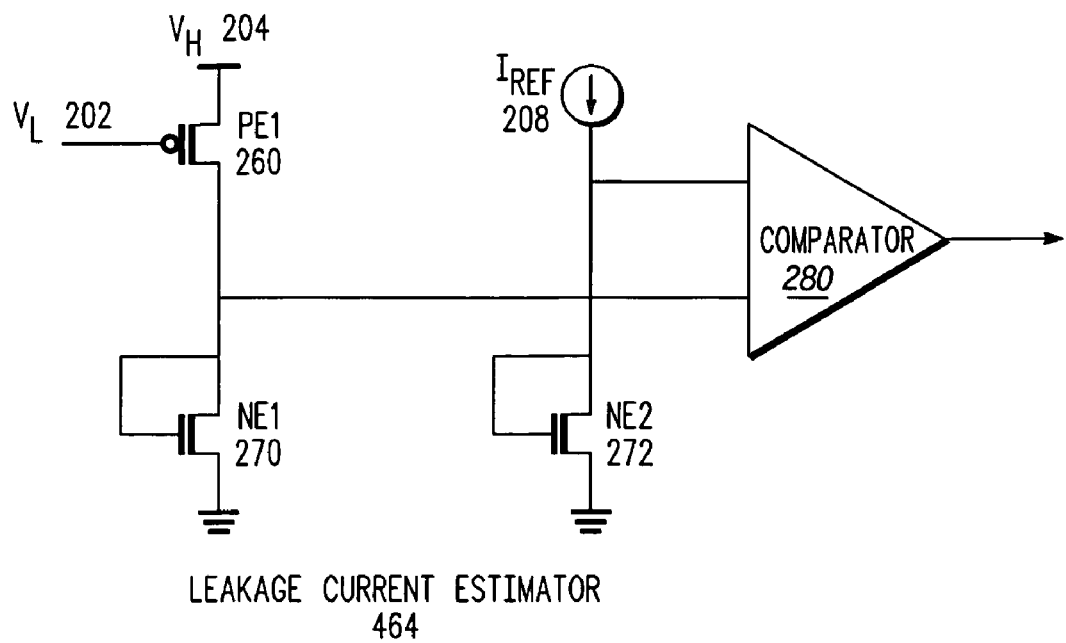
FIG. 9 illustrates a leakage current estimator, according to an embodiment of the invention.
Figure 10:
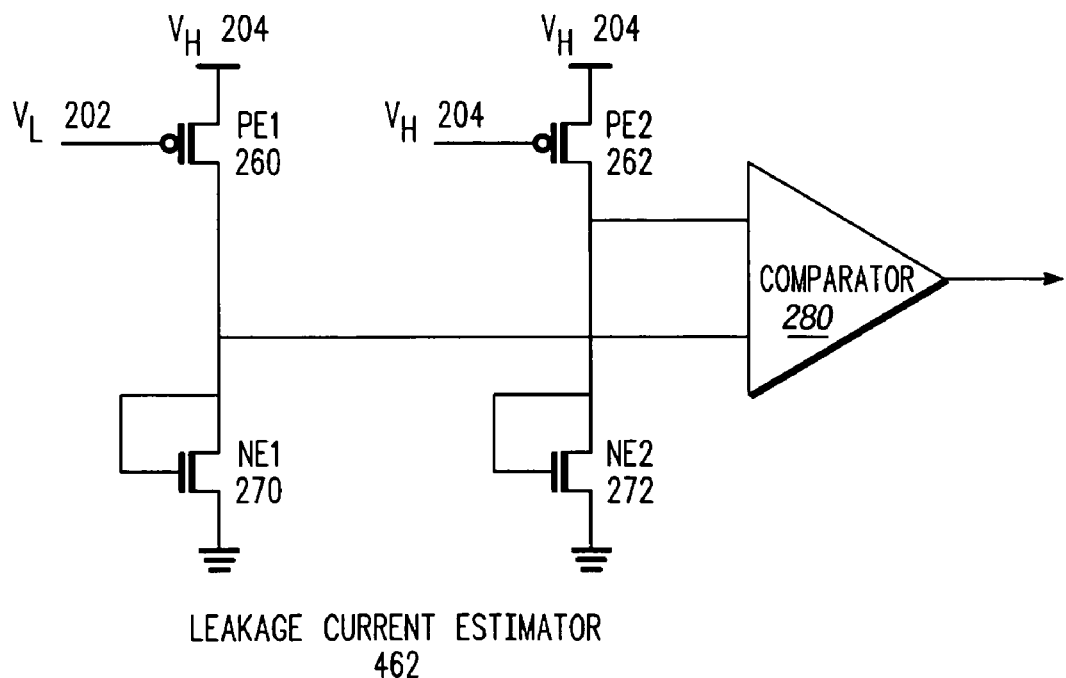
FIG. 10 illustrates a leakage current estimator, according to another embodiment of the invention.

FIG. 9 and FIG. 10 illustrates leakage current estimators that can belong to the first estimating circuit 46.

FIG. 9 illustrates a leakage current estimator 464, according to an embodiment of the invention.

Leakage current estimator 464 includes PMOS transistor PE1 260, NMOS transistor NE1 270, NMOS transistor NE2 272, current source $I_{REF}$ 208 and comparator 280. Comparator 280 can be a differential amplifier but this is not necessarily so.

The gate of PE1 260 is connected to $V_L$ 202 while the source of PE1 260 is connected to $V_H$ 204. The drain of PE1 260 is connected to the drain of NE1 270, to the gate of NE1 270 and to a first input of comparator 280 to provide a leakage current representative of the leakage current of the interface inverter 311. The source of NE1 270 is grounded.

The second input of comparator 280 is connected to a reference current source $I_{REF}$ 208, and to the drain and gate of NE2 272. The source of NE2 272 is grounded.

Comparator 280 outputs a signal representative of a difference between the leakage current of PE1 260 and the current supplied by reference source $I_{REF}$ 208.

FIG. 10 illustrates a leakage current estimator 462, according to another embodiment of the invention.

Leakage current estimator 462 differs from leakage current estimator 464 by including a PMOS transistor PE2 262 instead of the current source $I_{REF}$ 208.

The gate and source of PE2 262 receive $V_H$ 204. The drain of PE2 262 is connected to the second input of comparator 280 and to the drain and gate of NE2 272.

Figure 11:
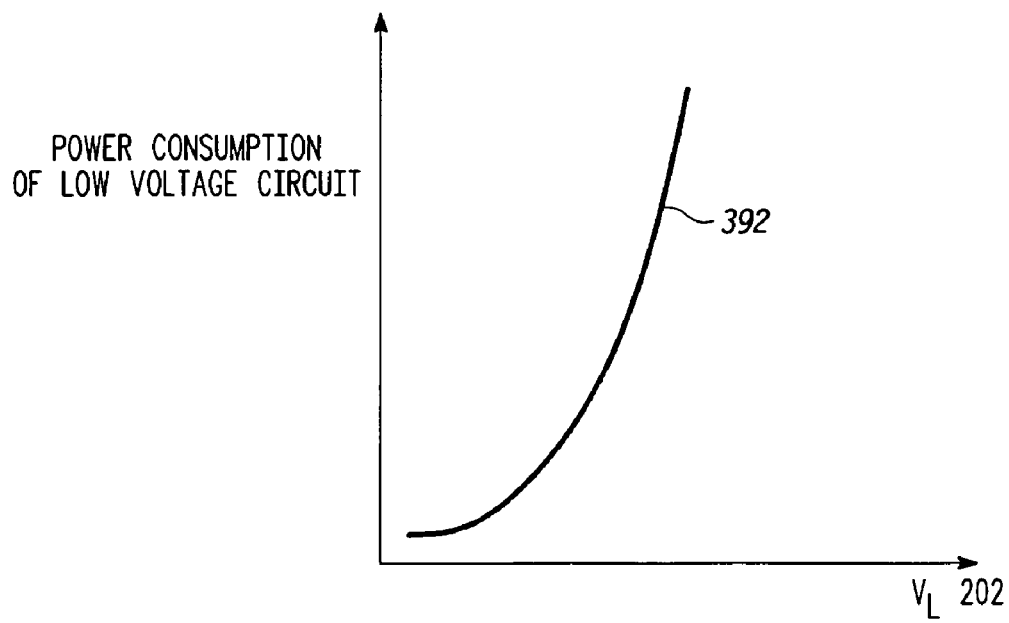
FIG. 11 illustrates a relationship between a low voltage level and a power consumed by a low voltage circuit.

FIG. 11 illustrates a relationship between a low voltage level and a power consumed by a low voltage circuit or its portion.

Curve 392 illustrates that the power consumed by a low power circuit, such as circuits that belong to second circuitry 42, is proportional to the square of to $V_L$ 202 That is provided to the second circuitry 42.

Figure 12:
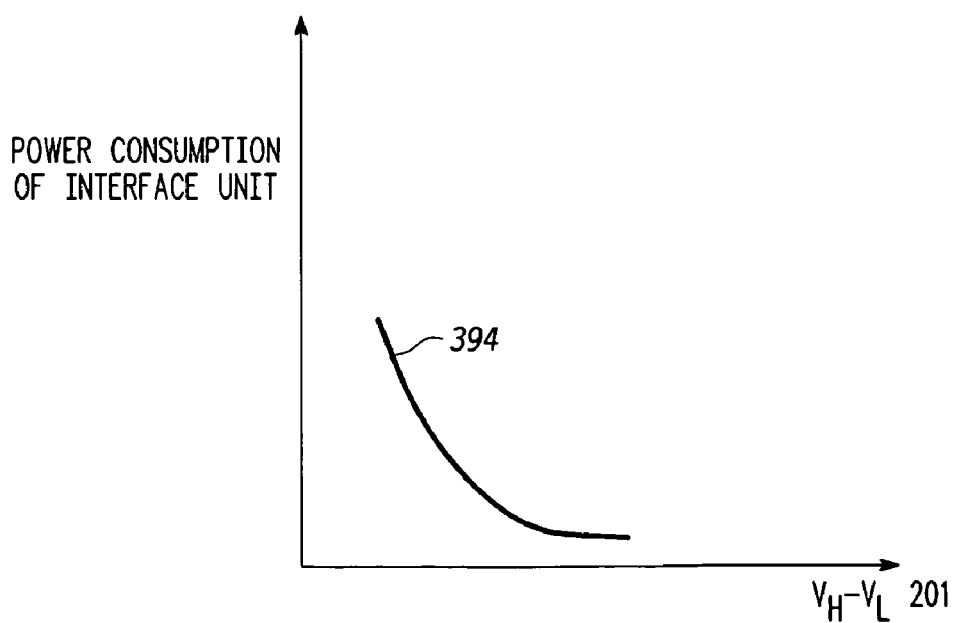
FIG. 12 illustrates a relationship between a difference between a high voltage level and a low voltage level that are supplied to an interface circuit and a power consumed by the interface circuit.

FIG. 12 illustrates a relationship between a difference between high voltage level and low voltage level that are supplied to an voltage level shiftless interface circuit and a power consumed by the voltage level shiftless interface circuit.

Curve 394 illustrates that the power consumed by an voltage level shiftless interface circuit is responsive to the exponent of the difference between $V_H$ 204 and to $V_L$ 202.

Figure 13:
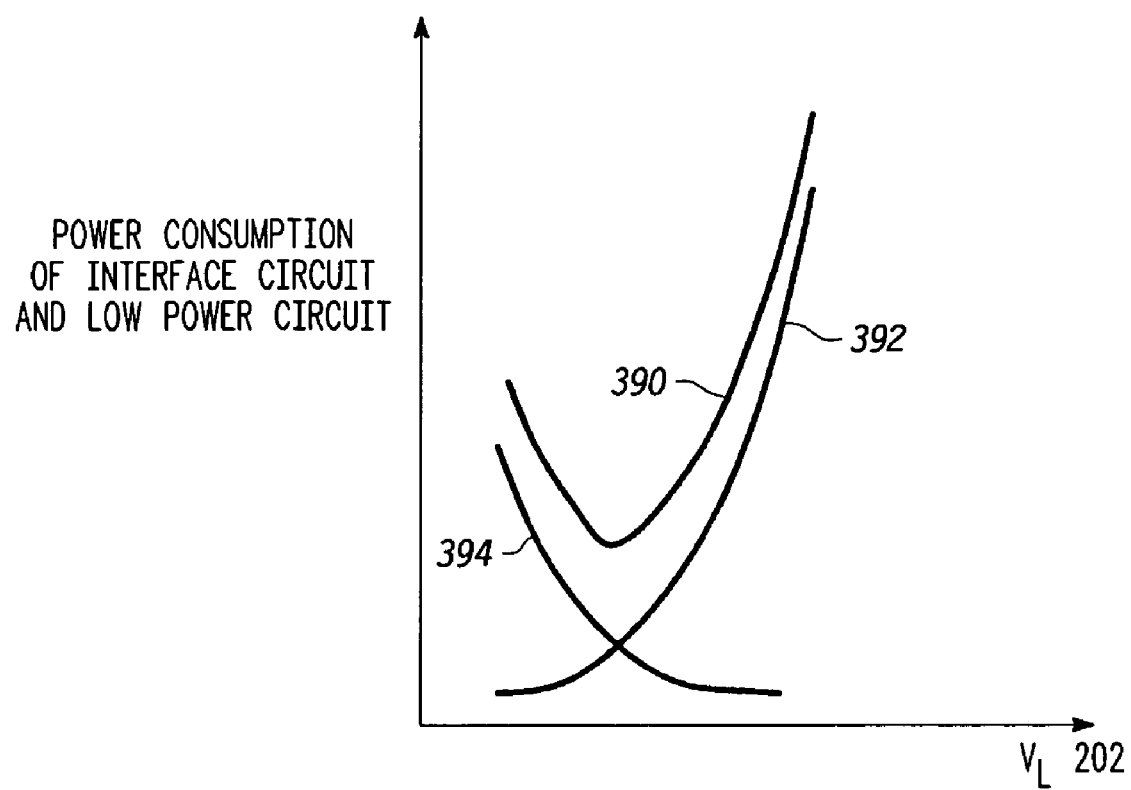
FIG. 13 illustrates a relationship between an aggregate power consumed by an interface circuit and by a low voltage circuit and between the low voltage level that is supplied to an interface circuit and to a low voltage circuit, assuming that the high voltage level is constant.

FIG. 13 illustrates a relationship between an aggregate power consumed by an voltage level shiftless interface circuit and a low voltage circuit and between the low voltage level that is supplied to an voltage level shiftless interface circuit and a low voltage circuit, assuming that the high voltage is constant.

Curve 390 illustrates the relationship between (i) the aggregate power consumed by a low level circuit that receives $V_L$ 202 and by an intermediate circuit that receives both to $V_H$ 204 and to $V_L$ 202, and (ii) difference between $V_L$ 202 and $V_H$ 204. Assuming that $V_H$ 204 is constant curve 390 represents the dependency between the consumed power and to $V_L$ 202.

Conveniently, the control unit tries to control $V_L$ 202 such as to maintain substantially at the minimum points of curve 390.

Figure 14:
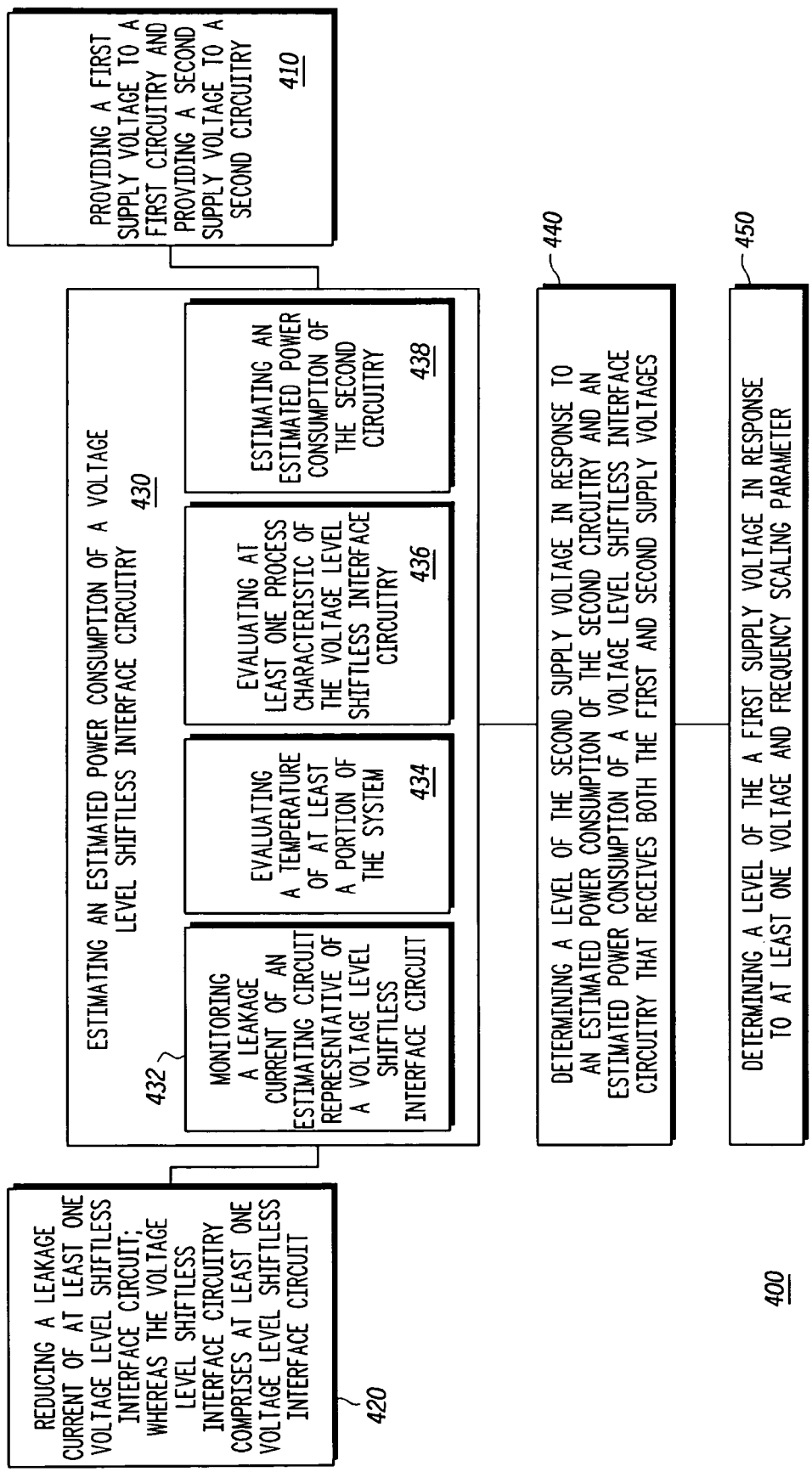
FIG. 14 is a flow chart of a method for providing voltage and clock signals to a system that includes multiple voltage supply units, according to an embodiment of the invention.

FIG. 14 is a flow chart of method 400 for controlling voltage level and clock signal frequency supplied to a system, according to an embodiment of the invention.

Method 400 starts by stages 410 and 420. Stage 410 includes providing a first supply voltage to a first circuitry and providing a second supply voltage to a second circuitry.

Optional stage 420 includes reducing a leakage current of at least one voltage level shiftless interface circuit; whereas the voltage level shiftless interface circuitry comprises at least one voltage level shiftless interface circuit. Stage 420 can be executed while other stages of method 400 are executed.

Stages 420 and 410 are followed by stage 430 of estimating an estimated power consumption of a voltage level shiftless interface circuitry. Conveniently, stage 430 includes stage 432 of monitoring a leakage current of an estimating circuit representative of a voltage level shiftless interface circuit. Conveniently, the monitoring includes comparing (i) a leakage current of an estimating circuit representative of a voltage level shiftless interface circuit to a (ii) current provided by a current source. Conveniently, stage 430 includes stage 434 of evaluating a temperature of at least a portion of the system. Conveniently stage 430 includes stage 436 of evaluating at least one process characteristic of the voltage level shiftless interface circuitry. Conveniently stage 430 also includes estimating 438 an estimated power consumption of the second circuitry.

Stage 430 is followed by stage 440 of determining a level of the second voltage in response to an estimated power consumption of the second circuitry and an estimated power consumption of a voltage level shiftless interface circuitry that receives both the first and second supply voltages. Conveniently, the determination of stage 440 is further responsive to at least one voltage and frequency scaling parameter.

According to an embodiment of the invention stage 440 includes determining a frequency of a second clock signal provided to the voltage level shiftless interface circuitry.

Method 400 can also include stage 450 of determining a level of the first supply voltage in response to at least one voltage and frequency scaling parameter.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for controlling voltage level and clock signal frequency supplied to a system, the method comprises:

providing a first supply voltage to a first circuitry and providing a second supply voltage to a second circuitry; and determining a level of the second supply voltage in response to an estimated power consumption of the second circuitry and an estimated power consumption of a voltage level shiftless interface circuitry that receives both the first and the second supply voltages.

2. The method according to claim 1 further comprising estimating the estimated power consumption of the voltage level shiftless interface circuitry.

3. The method according to claim 2 whereas the estimating comprises monitoring a leakage current of an estimating circuit representative of a voltage level shiftless interface circuit.

4. The method according to claim 3 whereas the monitoring comprises comparing a leakage current of an estimating circuit representative of a voltage level shiftless interface circuit to current provided by a current source.

5. The method according to claim 2 whereas the estimating comprises evaluating a temperature of at least a portion of the system.

6. The method according to claim 2 whereas the estimating comprises evaluating at least one process characteristic of the voltage level shiftless interface circuitry.

7. The method according to claim 1, further comprising reducing a leakage current of at least one voltage level shiftless interface circuit; whereas the voltage level shiftless interface circuitry comprises the at least one voltage level shiftless interface circuit.

8. The method according to claim 1, whereas the determining is further responsive to at least one voltage and frequency scaling parameter.

9. The method according to claim 1 further comprising determining a level of the first supply voltage in response to at least one voltage and frequency scaling parameter.

10. The method according to claim 1, whereas the determining comprises determining a frequency of a second clock signal provided to the voltage level shiftless interface circuitry.

11. A system comprising:
a first circuitry;
a second circuitry;
a first supply unit to provide a first supply voltage to the first circuitry;
a second supply unit to provide a second supply voltage to the second circuitry; and
a second control unit adapted to determine a level of the second supply voltage supplied by the second supply unit in response to an estimated power consumption of the second circuitry and an estimated power consumption of a voltage level shiftless interface circuitry that receives both the first and second supply voltages.

12. The system according to claim 11 whereas the second control unit is adapted to estimate an estimated power consumption of the voltage level shiftless interface circuitry.

13. The system according to claim 12 whereas the second control unit is coupled to a first estimating circuit that is adapted to provide an indication of a leakage current of a voltage level shiftless interface circuit.

14. The system according to claim 12, whereas the first estimating circuit comprises a comparator adapted to compare a leakage current of an estimating circuit representative of a voltage level shiftless interface circuit to current provided by a current source.

15. The system according to claim 11, whereas the system is adapted to evaluate a temperature of at least a portion of the system.

16. The system according to claim 11, whereas the system is adapted to evaluate at least one process characteristic of the voltage level shiftless interface circuitry.

17. The system according to claim 11, further comprising leakage current reducers.

18. The system according to claim 11, whereas the second control unit is responsive to at least one voltage and frequency scaling parameter.

19. The system according to claim 11, whereas the first control unit is responsive to at least one voltage and frequency scaling parameter.

20. The system according to claim 11, further adapted to determine a frequency of a second clock signal provided to the voltage level shiftless interface circuitry.

* * * * *